Dec. 29, 1959 R. E. BOYD 2,919,067
RATIO MEASURING APPARATUS
Filed May 25, 1955 3 Sheets-Sheet 2
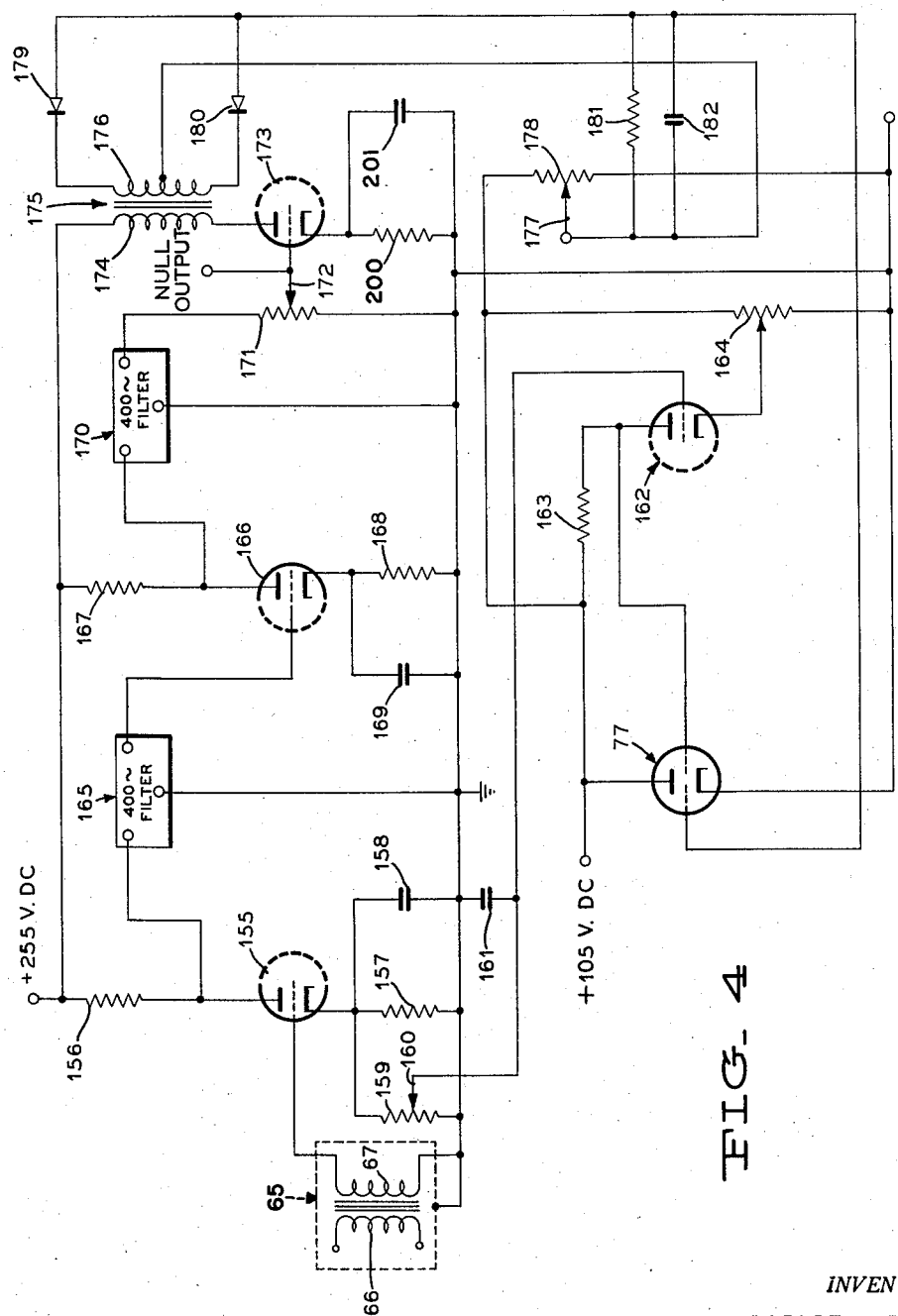
FIG_4
INVENTOR.
ROBERT E. BOYD
BY
Dewey J. Cunningham
ATTORNEY Dec. 29, 1959  R. E. BOYD  2,919,067
RATIO MEASURING APPARATUS
Filed May 25, 1955  3 Sheets-Sheet 3

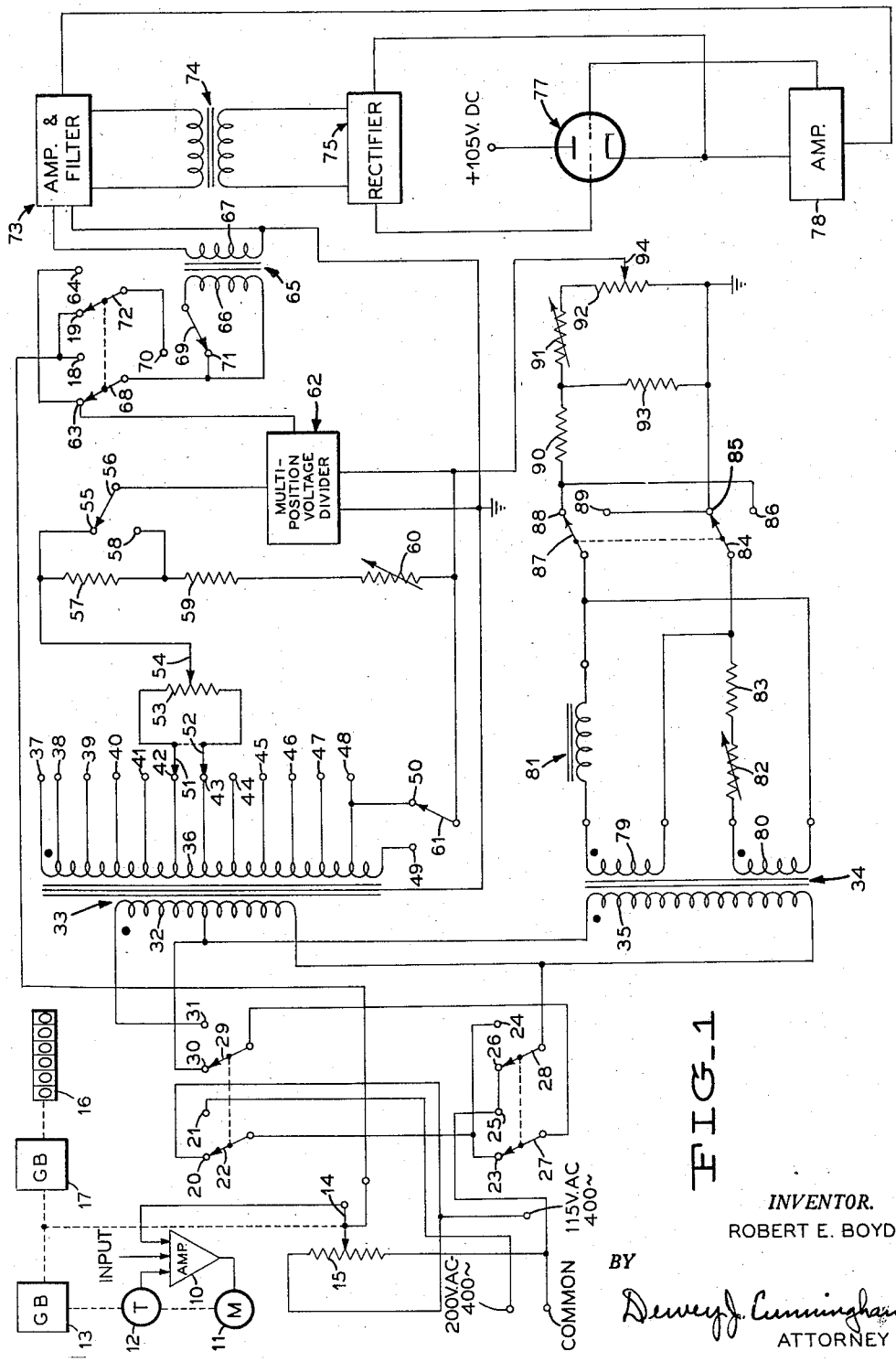

INVENTOR.
ROBERT E. BOYD
BY
Dewey J. Cunningham
ATTORNEY

United States Patent Office 2,919,067
Patented Dec. 29, 1959

2,919,067

RATIO MEASURING APPARATUS

Robert E. Boyd, Endicott, N.Y., assignor to International Business Machines Corporation, New York, N.Y., a corporation of New York Application May 25, 1955, Serial No. 511,037

2 Claims. (Cl. 235—196)

The present invention relates to measuring apparatus and particularly to such an apparatus for determining the ratio between two unknown voltages.

In computing apparatus of the analog type, the overall accuracy of the apparatus is largely determined by the accuracy of the components used therein. While most of the components may be purchased from reliable vendors, it is still necessary to test every component which goes into the apparatus. It will be apparent that it is much easier to test all of the components individually to locate those having the proper characteristics than it is to check an entire computer to locate faulty components. Examples of the many measurements which must be made will be apparent when it is realized that it is necessary to check the linearity of potentiometers, the function error of resolvers, and the turns ratio of transformers. Also, A.C. computer inputs, scale factor selecting apparatus, and servo system accuracy must be measured. In addition, small angles of phase shift in the apparatus must be detected. By way of example, a potentiometer to be checked for linearity may be placed in a D.C. bridge and voltage readings taken at predetermined positions throughout the length of the potentiometer. The readings are then plotted and the best straight line is drawn therethrough. The reading which is furtherest from the straight line determines the percentage of linearity which can be assigned to the potentiometer. However, the use of a D.C. bridge for testing components to be used in an A.C. computing apparatus fails to detect phase shifts which may occur at different points in a component or a system of components.

The present invention has been designed to make all of the measurements described above to an accuracy of as much as one part in ten thousand.

An object of the present invention is to provide a new and improved measuring apparatus which is capable of quickly and simply measuring the ratio between two potentials to a high degree of accuracy.

Another object of the invention is to provide a new and improved measuring apparatus which is capable of testing electrical components which are to be used in an A.C. system.

Still another object of this invention is to furnish an improved measuring apparatus which produces a direct reading of the ratio between two unknown A.C. potentials and at the same time determines the relative phase angle between the two potentials.

Briefly, the invention includes a comparing station for receiving two A.C. voltages and producing an output potential which is a function of the difference between the amplitudes of the said two voltages. One of the said two voltages is adapted to be received from a known reference position on a device which is being tested. The other of said two voltages is obtained from an adjustable source of potential and is supplied through an accurate multi-position voltage divider which is adjusted for unity division. The said multi-position divider, by way of example, may be able to divide a voltage supplied thereto into ten thousand parts. However, at unity division it supplies the same potential as an output that it receives. The said adjustable source of potential is adapted to be adjusted until the comparing station has a zero output. In order to detect when this zero output condition exists, an amplifying device is arranged to receive the output from the comparing station and supply an amplified form thereof to a null indicating device. After the said adjustable source of potential is adjusted to the point where the indicating device is at a null, the device being tested is operated until a new position is achieved, the relationship between said new position and said reference position being known. Naturally, this causes the indicating device to leave the null position. Now the accurate multi-position voltage divider is adjusted until the indicating device is again at a null. At this time a reading may be obtained directly from the said voltage divider which may be used to determine the ratio between the potential at the new position and the potential at the reference position. Since the said new position had a known relationship to said reference position, it is now possible to compare the said known relationship with the said ratio to determine the error in the device. The device being tested may be changed to other positions having a known relationship to said reference position so that other readings may be taken. Since the two voltages being compared are A.C. voltages it is also necessary to make a phase adjustment of the said adjustable source of potential so that the two voltages have the proper phase relationship.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a schematic diagram of the present invention, there being portions of the apparatus which are shown in block form;

Fig. 4 is a schematic diagram of the comparing station, the error amplifier and the null indicator used with the present invention;

Figure 3:
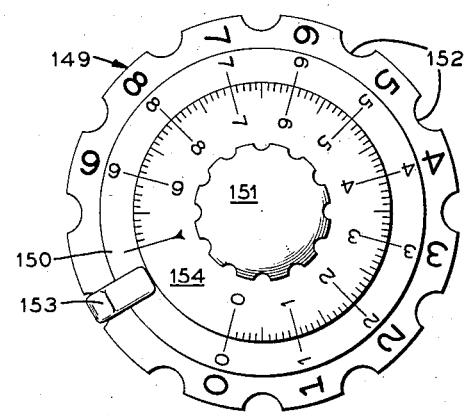
Fig. 3 shows the arrangement of the control dials which are used to operate the movable contacts on the voltage divider shown in Fig. 2.

Referring now to Fig. 1 of the drawings, the device which is to be tested is a potentiometer in a positional servo. It will be understood that this arrangement is illustrative only, since many other devices may also be tested with the present invention. The positional servo includes an amplifier 10 which is adapted to receive an input potential. The output from the amplifier is supplied to a reversible motor 11 which is shaft connected to a tachometer 12. The electrical output from the tachometer is fed to the amplifier for damping purposes. A gear box 13 is interposed between the tachometer and the slider 14 of potentiometer 15. A fixed potential is placed across potentiometer 15 by suitable connections to a source of potential, herein indicated as 115 volts A.C. at a frequency of 400 cycles per second. The electrical potential on slider 14 is connected to amplifier 10 as a feed-back potential. There is also provided a mechanical counter 16 which is shaft connected to gear box 13 through a gear box 17. The counter is illustrated as having six positions.

So that a specific example of the use of the servo may be chosen, the input to the amplifier may be an analog signal representative of the altitude of an aircraft. Let it be assumed that when the slider 14 is at the low end of the potentiometer 15, the voltage on the slider is a minimum and counter 16 reads 000000. When the slider is at the high end of the potentiometer, the potential on the slider will be a maximum and the counter will read 100,000. This reading is in feet. The present invention may be used to determine if the potential on the slider at other numerical indications of counter 16 bears the same relationship to the maximum potential as the numerical indication of the counter bears to the maximum numerical indication. The output potential on slider 14 is connected to commoned stationary contacts 18 and 19 and serves as one of the two potentials to be compared. Initially, the slider is positioned to a reference position which in this instance may produce the maximum potential on the slider. In this event the counter 16 would indicate 100,000 feet.

To obtain the other of the two potentials to be compared, connections are made from the 115 v. A.C. 400 cycle supply terminal to stationary contact 20 and from the 200 v. A.C. 400 cycle supply terminal to stationary contact 21. The movable contact 22 is adapted to be positioned to engage either of stationary contacts 20 or 21 and in either position connects the potential of the contact which it engages to commoned stationary contacts 23 and 24. The supply common is connected to commoned stationary contacts 25 and 26. Movable contacts 27 and 28 are mechanically coupled together so that in one position they engage stationary contacts 23 and 26, respectively, and in the other position they engage stationary contacts 25 and 24, respectively. From the above it will be seen that movable contact 22 selects the desired potential, i.e., 115 v. A.C. or 200 v. A.C., and movable contacts 27 and 28 may be used to select the phase, for excitation purposes, of the selected potential.

Movable contact 27 is connected to a movable contact 29 which is adapted to engage either of stationary contacts 30 or 31. It will be seen, however, that movable contact 29 is coupled to movable contact 22. Thus, the selection of the potential by movable contact 22 determines which of stationary contacts 30 and 31 the movable contact 29 will engage. The reason for movable contact 29 will be apparent when it is seen that it selects the position on primary 32 of transformer 33 to which the selected potential is to be connected. Note that stationary contact 30 is connected to an intermediate point on the primary while stationary contact 31 is connected to one end of the primary. The arrangement is such that when 115 v. A.C. is selected, this potential is applied to said intermediate point, and when 200 v. A.C. is selected, it is applied to said one end of the primary. The potential on movable contact 28 is connected to the other end of primary 32.

In dealing with A.C. potentials, it is necessary to assure that the phase of the selected potential be identical with the phase of the potential received from slider 14 of potentiometer 15. To accomplish this phase adjustment, there is provided a transformer 34 having a primary 35 whose end terminals are adapted to be connected to the said intermediate point and said other end of primary 32. The details of the phase adjusting circuit will be discussed hereinafter. Transformers 33 and 34 and their associated circuitry form the voltage translating means for applying the correct magnitude and phase input potential to the multi-position voltage divider previously referred to.

The secondary 36 of transformer 33 is tapped at a number of points and connected to separate stationary contacts which are consecutively numbered from 37 through 49. A stationary contact 50 is connected in common with stationary contact 48. The arrangement is such that the potential between stationary contacts 37 and 48 is approximately the same no matter which of the source potentials is impressed on primary 32. All of the stationary contacts 38 through 48 are connected to the secondary 36 at such points that the difference in potential between any two adjacent stationary contacts is the same as the difference in potential between any other two adjacent contacts, i.e., 10 volts. Between stationary contacts 37 and 38 there exists 15 volts. Thus, the total voltage between stationary contacts 37 through 48 is 115 volts.

A pair of movable contacts 51 and 52 are mechanically coupled to move together. The arrangement is such that these two movable contacts may be connected to any adjacent pair of stationary contacts 37 through 48. A potentiometer 53 having a slider 54 is connected across movable contacts 51 and 52. By adjusting slider 54 it is possible to obtain any potential between the potentials on movable contacts 51 and 52. Slider 54 is connected directly to a stationary contact 55 and through a resistor 57 to a stationary contact 58. A movable contact 56 is arranged to engage either of stationary contacts 55 or 58. It will be remembered that terminals 49 and 50 were provided on secondary 36. A movable contact 61 is arranged to selectively engage either of these stationary contacts so that the potential at the stationary contact engaged is applied through a variable resistor 60 and a fixed resistor 59 to the aforementioned stationary contact 58. The potential on slider 56 is arranged to be applied to the high side of a precision multi-position voltage divider 62 while the potential on movable contact 61 is permanently to be connected to the low side of divider 62. It will be seen that appropriate ground connections have been made to transformer 33 and the housing of divider 62. The output selected from the multiposition voltage divider is connected to commoned stationary contacts 63 and 64.

The circuit heretofore described serves to take care of the in-phase component of source voltage. The circuit now to be described provides the proper amount of quadrature to shift the phase of the supply voltage to match that of the input voltage from slider 14 of potentiometer 15. The adjustment of the quadrature component is accomplished by means of a phase-shifting network which includes secondaries 79 and 80 of transformer 34, an inductance 81, a variable resistor 82 and a fixed resistor 83. The arrangement is such that the inductance 81 is connected between what might be termed a high end of secondary 79 and a low end of secondary 80. Resistors 82 and 83 are connected between the low end of secondary 79 and the high end of secondary 80. The said low end of secondary 79 is directly connected to a movable contact 84 which is adapted to engage either of stationary contacts 85 or 86. The said low end of secondary 80 is connected to a movable contact 87 which is adapted to engage either of stationary contacts 88 or 89. It will be noted that stationary contacts 86 and 88 are commoned together and that stationary contacts 85 and 89 are also commoned together. Movable contacts 84 and 87 are mechanically coupled together and serve to determine whether the phase of the quadrature voltage will be leading the supply voltage by 90° or lagging the supply voltage by 90°. That is, inductance 81 and resistors 82 and 83 form a 90° phase-shifting network and supply the phase-shifted voltage to movable contacts 84 and 87. If these movable contacts are adapted to engage stationary contacts 85 and 88, respectively, this phase-shifted voltage will lead the supply voltage by 90°. If, on the other hand, movable contacts 84 and 87 are connected to stationary contacts 86 and 89, respectively, the quadrature-phase component will lag the supply voltage by 90°. The commoned stationary contacts 86 and 88 are connected through a fixed resistor 90 and a variable resistor 91 to one end of a quadrature-adjusting potentiometer 92. The commoned stationary contacts 85 and 89 are connected to the other side of potentiometer 92 and to ground. A dropping resistor 93 is connected between ground and a point between fixed resistor 90 and variable resistor 91. Slider 94 on potentiometer 92 is connected in common with the movable contact 61 and the afore-mentioned other side of the multi-position voltage divider 62.

The comparing station comprises a transformer 65 having a primary 66 and a secondary 67. One end of primary 66 is connected to a movable contact 68 which is adapted to engage either of stationary contacts 63 or 18. The other end of primary 66 is connected to a movable contact 69 which is adapted to engage either of stationary contacts 70 or 71. Stationary contact 70 is directly connected to a movable contact 72 which is arranged to engage either of stationary contacts 19 or 64. It will be seen that movable contacts 68 and 72 are mechanically coupled together to move as a unit and serve to determine which of the two potentials to be compared will be applied to the upper or lower ends of primary 66. It will be seen that when movable contact 69 is connected to stationary contact 71 there is no potential difference across primary 66. This is a calibrate position and is provided so that the null indicator can be adjusted to a null with zero potential across said primary. The secondary 67 has one terminal connected to an amplifying and filtering circuit 73 while the other end thereof is connected to ground. The amplified output from circuit 73 is coupled through transformer 74 to a rectifier 75. The last-named device rectifies the output from the amplifier and supplies a potential to the "fine" control grid of an electron eye tube 77. A ground connection is also made from rectifier 75 to the cathode of tube 77. Tube 77 may be of the well known commercial type 6AF6–G electron-ray (popularly known as electron eye) tube. Such a tube is of general use to indicate visually, by means of two shadows on a fluorescence target, the effects of changes in the controlling voltages applied to two separate control grids, one for each shadow. Thus, the voltage applied to one control grid (which may be termed a "coarse" control grid) produces one of the aforementioned shadows and the voltage applied to the other control grid (which may be termed the "fine" control grid) produces the other of the aforementioned shadows.

As will be more apparent hereinafter a potential is picked from the first stage of circuit 73 and supplied to an amplifier 78, the output from said amplifier being connected to the coarse control grid of tube 77. The ground side of the amplifier output is also connected to the cathode of the last-mentioned tube.

Before going into a detailed description of the operation of the present invention, the details of some of the circuits shown in block form in Fig. 1 will now be described.

Figure 2:
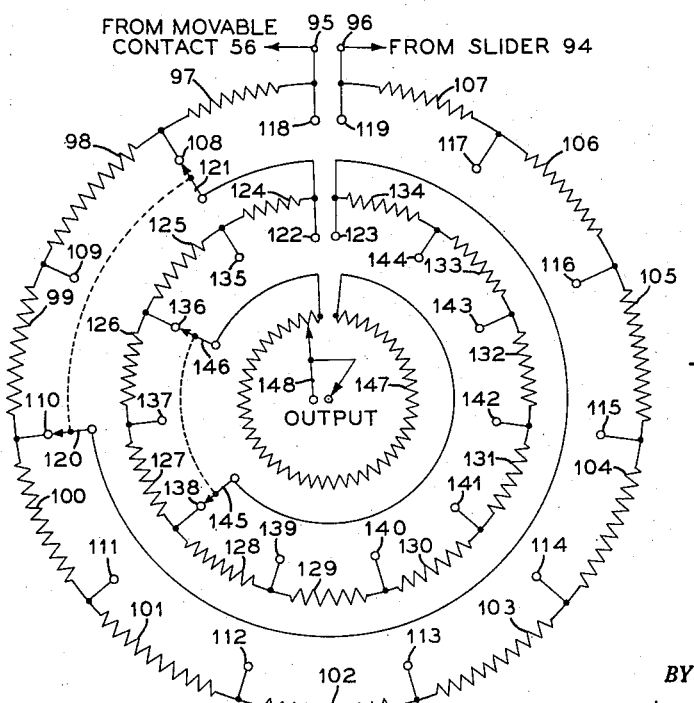
Fig. 2 is a schematic diagram of the precision multi-position voltage divider which may be used in the present invention.

The multi-position voltage divider 62 is shown in Fig. 2. It will be understood that the multiposition voltage divider is shown only schematically. The output from movable contact 56, as shown in Fig. 1, is supplied to a terminal 95 and the output from slider 94 is supplied to terminal 96. Between these two terminals there is furnished eleven resistors which are numbered consecutively from 97 through 107. Between adjacent resistors stationary contacts are provided. These contacts are numbered consecutively from 108 through 117. Terminals 118 and 119 are commoned with terminals 95 and 96, respectively. Movable contacts 120 and 121 are mechanically coupled together and are adapted to selectively engage a desired alternate pair of said stationary contacts. For example, Fig. 2 shows movable contacts 120 and 121 in engagement with stationary contacts 110 and 108. If the total resistance between terminals 118 and 119 is equal to 11R, then the value of each of resistors 97 through 107 will be equal to R. Thus, the total resistance between the movable contacts 120 and 121 is equal to 2R.

The above-described movable contacts 120 and 121 are connected to terminals 122 and 123, respectively, between which terminals there is provided eleven more resistors which are consecutively numbered 124 through 134. Between each pair of adjacent resistors in this ring a plurality of stationary contacts 135 through 144 is provided. Movable contacts 145 and 146 are coupled together and arranged to selectively engage alternate ones of the stationary contacts. As shown, movable contacts 145 and 146 engage stationary contacts 138 and 136, respectively. The total resistance between terminals 122 and 123 in this particular ring of resistors will be equal to 2.2R so that the value of each resistor is equal to $$\frac{2.2}{11}R$$

Movable contacts 145 and 146 are connected to the end terminals of a single resistance element 147. A slider 148 is adapted to traverse the length of the last-named resistance element. The output which is to be supplied to stationary contacts 63 and 64, as shown in Fig. 1, is taken from slider 148. The total value of resistance in resistance element 147 is equal to .4R.

It should be understood that movement of contacts 120—121, 145—146, and 148 is accomplished individually. As shown in Fig. 3, the dialing arrangement for operating these contacts comprises a rotatable ring 149 for operating movable contacts 120 and 121, a movable ring 150 for operating contacts 145 and 146 and a knob 151 for operating slider 148. Rotation of ring 149 is facilitated by the arcuate detents 152 which are provided on the outer periphery of said ring. It will be seen that ring 149 is numbered 0 through 9, and if one inspects Fig. 2, it will be seen that there are ten possible positions for movable contacts 120—121. Rotation of ring 150 is facilitated through a handle 153 which is secured to ring 150. Ring 150 is also provided with indicia which is marked 0 through 9. This corresponds to the ten possible positions through which movable contacts 145—146 may be moved. Knob 151 is adapted to rotate slider 148 throughout 360°. The knob is secured to a dial 154 which is provided with a scale which is divided into one hundred equal parts.

The multi-position voltage divider shown in Fig. 2 is capable of dividing the potential which exists between terminals 95 and 96 into any number of parts between 0 and 10,000. Sliders 120—121 select the thousandths position while sliders 145—146 select the hundredths position. Since slider 148 is connected to a dial which is scaled in one hundred different positions, it selects the units and tens positions. During the initial setup the voltage divider shown in Fig. 2 may be adjusted to unity division by setting movable contacts 120—121 in engagement with stationary contacts 109 and 118, respectively, setting movable contacts 145—146 to engage stationary contacts 136 and 122, respectively, and setting slider 148 to the position where it is in the same potential as slider 146. This allows the output potential from slider 148 to be equal to the input potential which is received from movable contact 56.

Figure 7:
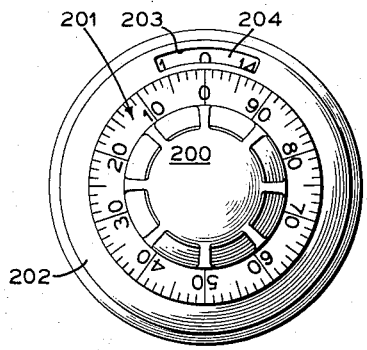
Fig. 7 shows the dial arrangement for operating the quadrature adjusting potentiometer.

The dial for the quadrature adjusting potentiometer 92 is shown in Fig. 7. This potentiometer is of the conventional ten-turn slide wire type. The dial includes a single hand knob 200 which is used to rotate slider 94. This knob is secured to a dial 201 which has a scale thereon divided up into one hundred parts. Since the potentiometer contains ten turns, it takes ten complete revolutions of knob 200 to move slider 94 from one end to the other of the resistance element. A fixed ring 202 is arranged outside of dial 201 and is provided with a window 203. A second dial 204, which is only partially shown through the window, is mounted for rotation beneath ring 202. Dial 204 is graduated from zero to nine and is arranged to index from one number to another with each revolution of knob 200 and dial 201. It should be understood that dials such as those shown in Fig. 7 are conventional and the details thereof do not form a part of the present invention.

Reference is now made to Fig. 4 which shows the schematic details of the portion of Fig. 1 which is utilized to amplify and rectify the error signal and supply it to a null indicator. It will be remembered that one of the input signals is applied to one end of the primary 66 and the other of said signals is applied to the other end of primary 66. One end of the secondary 67 is connected to ground and the other end thereof is connected to the control grid of a triode 155, the plate of said triode being connected through a plate resistor 156 to a source of B+ potential which in the present invention is a regulated voltage of +255 v. D.C. The cathode of triode 155 has the conventional RC coupling arrangement to ground which includes resistor 157 and capacitor 158 in shunt therewith. A potentiometer 159 is connected between the cathode and ground and is provided with a slider 160, said slider being coupled through a filtering capacitor 161 to ground. The potential on slider 160 is connected to the control grid of triode 162 whose plate is connected through a resistor 163 to a B+ source of potential which in the present instance is a regulated voltage of 105 v. D.C. The cathode of triode 162 is connected to the slider of a potentiometer 164 which is connected between the last-named B+ source and ground. The plate of triode 162 is also connected to the "coarse" control grid of electron eye tube 77. Thus, an increase in potential on the cathode of triode 155 causes an increase in potential on slider 160 of potentiometer 159 which, when amplified through triode 162, causes the electron eye tube 77 to open. To obtain the "fine" control voltage the output from the plate of triode 155 is connected through a 400 cycle filter 165 to the control grid of triode 166, the plate of the last-named triode being connected through a resistor 167 to the +255 v. D.C. source of potential. The cathode of triode 166 is RC coupled to ground through a resistor 168 and a capacitor 169 which are arranged in parallel. The plate output of triode 166 is coupled through a second 400 cycle filter 170 to the upper end of a potentiometer 171, the lower end of said potentiometer being connected to ground. Both of filters 165 and 170 are of conventional design and serve to filter out substantially all but the 400 cycle frequency component of the potentials received from the plates of triodes 155 and 166, respectively.

A potential is picked off slider 172 and fed to the control grid of triode 173, the plate of said triode being coupled through the primary 174 of a transformer 175 to the afore-mentioned +255 v. D.C. source of potential. The cathode of triode 173 is RC coupled to ground by means of resistor 200 and capacitor 201 in parallel therewith. The secondary 176 of transformer 175 has its midpoint connected to the slider 177 of a potentiometer 178 which is connected between the 105 v. D.C. source of potential and ground. The upper end of secondary 176 is connected to the cathode of a diode 179 and the lower end of said secondary is connected to the cathode of a diode 180, the plates of both diodes being commoned for connection to the "fine" control grid of electron eye tube 77. The reason one of the inputs to tube 77 is considered a "coarse" control and the other a "fine" control is due to the fact that in response to a given input error voltage at the grid of tube 155, a proportionally larger change in voltage occurs at the "fine" control grid of tube 77 (provided by the path comprising the amplifiers including tubes 155, 166, 173 and rectifiers 179, 180) than occurs at the "coarse" control grid (provided by the path including potentiometer 159 and the amplifier including tube 162). This means that the "fine" control grid is provided with greater sensitivity than the "coarse" control grid (due to the greater amplification in this path) when the input to the control grid of tube 155 is reduced to very low levels. Thus, as a null condition is approached, the shadow representing the "coarse" condition of the tube will close prior to the shadow representing the "fine" condition of the tube. It will be noted that resistor 181 and capacitor 182 are arranged in parallel with each other and are connected between the said common plates of diodes 179 and 180 and the mid-point of secondary 176. The last-named resistor and capacitor arrangement serves to filter the output of diodes 179 and 180, the last-named diodes serving to rectify the output from transformer 175.

A description will now be given relative to the manner of operation of the present invention in checking the linearity of the potentiometer 15 which has been previously described. Referring to Fig. 1, the first operation to be performed is to engage movable contact 69 with stationary contact 71 to set up a zero error signal out of transformer 65. It is now possible to adjust the sliders 160 and 177, shown in Fig. 4, to control the sensitivity of the electron eye tube 77. The adjustment should be made such that the eye of the tube is completely closed. After calibration of the null indicator as just described, movable contact 69 is engaged with stationary contact 70.

An input potential is now applied to amplifier 10 to position slider 14 to have a maximum output such that the counter 16 now indicates, by way of example, 100,000 feet. The potential on the slider is now available at stationary contacts 18 and 19. Depending on which of the two supply voltages is available, i.e., 200 v. A.C. or 115 v. A.C., movable contacts 22 and 29 are positioned accordingly. Let it be assumed, by way of example, that the movable contacts 22 and 29 are engaged with stationary contacts 20 and 30, respectively. It is now necessary to operate movable contacts 27 and 28 to select the phase of the potential supply which is substantially identical with the phase of the potential from slider 14. Assume that movable contacts 27 and 28 are properly positioned as shown in Fig. 1. This means that the potential supply will be connected between the intermediate tap of primary 32 and the lower end thereof. It will be appreciate that either 200 v. A.C. or 115 v. A.C. will produce a potential difference of 115 v. A.C. between stationary contacts 37 and 48 of secondary 36. The design of transformer 33 is such that it provides a low source of impedance to the multi-position voltage divider 62. Thus, maximum accuracy in the divider is afforded.

Figure 5:
Figs. 5 and 6 are vector diagrams of two angularly related A.C. potentials.
Figure 6:

Now movable contacts 51 and 52 are changed so that they engage stationary contacts 37 and 38, respectively, and slider 54 is adjusted to supply the proper potential to the multi-position voltage divider 62, through movable contact 56, to produce an output from said divider to stationary contacts 63 and 64 for comparison with the potential from slider 14. There now exists, assuming unity division in voltage divider 62, a difference in potential across primary 66 which is substantially proportional to the difference in potential between the two voltages which exist on movable contacts 68 and 72. It will be appreciated that the two voltages may be slightly different in phase. However, before the quadrature adjusting potentiometer 92 is changed, slider 54 is adjusted until the eye of tube 77 closes as much as it will with the present phase relationship between the two voltages being compared. Now slider 94 is adjusted until the eye of tube 77 closes even more. It may be easier to understand the necessity of phase adjustment between the two voltages if a reference is made to Figs. 5 and 6. Let it be assumed that vector 183 represents the in-phase component of the input voltage from slider 14. Vector 184, therefore, will represent the quadrature-phase component which produces the resultant vector 185. It will be seen that the resultant vector 185 has a phase angle of $\phi_1$ from the in-phase component 183. Referring now to Fig. 6, vector 186 represents the in-phase component of the voltage presented from the multi-position voltage divider 62 while vector 187 represents the quadrature-phase component of said voltage. Thus, there is produced a resultant vector 188 which is at a phase angle of φ2 with respect to the in-phase component. The adjustment of slider 94 on potentiometer 92 can now be used to vary the quadrature-phase vector 187 by the proper amount to make it equal to the quadrature vector 184 shown in Fig. 5. It will be apparent that a change in the quadrature component also causes a change in the in-phase component and it is for this reason that both of sliders 54 and 94 must be alternately adjusted until the best null is produced. Movable contacts 84 and 87 determine the polarity of the quadrature-phase component. In the example shown in Figs. 5 and 6 it is necessary to decrease the quadrature-phase component which is illustrated by vector 187.

Once the null indicator has been adjusted to a null, there now exists on both sides of the primary 66 the identical voltage that represented 100,000 feet in the positional servo previously described. An input potential is now applied to amplifier 10 to move the slider 14 down the potentiometer 15 until counter 16 indicates 50,000 feet. Thus, the output from slider 14 should be exactly one-half of what it was when the counter registered 100,000 feet. The multi-position voltage divider 62 is now adjusted until the eye of tube 77 closes as much as it will with the present setting of slider 94 in the quadrature adjusting circuit. The dial shown in Fig. 3 may, for example, read 5100 at this time. Since, in moving the slider 14 down to the mid-point of potentiometer 15, it is possible that the phase of the voltage has shifted slightly, it is now necessary to adjust slider 94 until the eye in tube 77 closes even more. By alternately adjusting divider 62 and slider 94 it is possible to obtain a maximum closing of the eye in tube 77. At this time the reading on divider 62 may be, by way of example, 5120. This indicates that the potentiometer is out of linearity at its mid-point by an amount which is proportional to one hundred twenty parts in ten thousand parts.

It will be seen that other settings in counter 16 may be made in order to determine the linearity of the entire potentiometer. It may be that there will be times when the end resistance of potentiometer 53 will not allow the output from slider 54 to equal the voltage at either end of potentiometer 53. At this time movable contact 61 is engaged with stationary contact 49. The difference in potential between stationary contacts 50 and 49 is equal to 1 volt so that now there is a total of 116 volts between stationary contacts 37 and 49. Now slider 54 may be moved along potentiometer 53 until the desired potential is obtained.

It will be seen that if all readings along the length of potentiometer 15 are taken using the top position as a reference point, the accuracy with which a particular section at the lower end of the potentiometer can be measured is less than it would be if, by way of example, the mid-point of potentiometer 15 were used as a reference potential. For example, if the potentiometer output at 100,000 feet were used as the reference point, the number of divisions between 10,000 feet and zero feet would be one thousand. However, if it were possible to use 10,000 feet as the reference point then there would be ten thousand divisions between 10,000 feet and zero feet. So that some lower point on potentiometer 15 may be utilized as a reference point the voltage divider 62 is positioned until it reads 1000. Slider 14 is adjusted until a null is produced at tube 77. Movable contact 69 is moved into engagement with stationary contact 71 so that there is zero error fed to the null detector. At this time the voltage divider 62 is moved back to its unity division position, which may be termed a reading of 10,000. The reason for engaging movable contact 69 with a stationary contact 71 is to protect the amplifier and null detector from receiving a very large error signal which may damage the components thereof. At this time movable contact 56 is moved into engagement with stationary contact 58 and movable contact 69 is changed to engage stationary contact 70. The variable resistance 60 is now adjusted until tube 77 indicates a null. Now there exists a possibility of ten thousand positions at 10,000 feet whereas previously there was only one thousand positions.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for determining the ratio between first and second A.C. voltages, a source of A.C. reference voltage, adjustable voltage translating means connected to receive said source of A.C. reference voltage and to supply an A.C. output voltage therefrom which is equal to said first A.C. voltage, said voltage translating means including means for varying the phase of said A.C. output voltage, comparing means having an input circuit and an output circuit, a multi-position voltage divider having adjustable slider means for coupling the output voltage from said voltage translating means to the input circuit of said comparing means, said input circuit also being adapted to receive said second A.C. voltage, and a null detecting circuit including an amplifier and an electron eye tube, said amplifier being coupled to the output circuit of said comparing means and said electron eye tube having fine and coarse control means connected to separate points in said amplifier, the arrangement being such that said eye will indicate when the voltage from said multi-position voltage divider is equal to said second A.C. voltage, the position of said adjustable slider means of said multi-position voltage divider at a time when said null detecting circuit detects a null condition determining the ratio between said first and second A.C. voltages.

2. Apparatus for determining the ratio between first and second A.C. voltages, a source of A.C. reference voltage, adjustable voltage translating means connected to receive said source of A.C. reference voltage and to supply an A.C. output voltage therefrom which is equal to said first A.C. voltage, said voltage translating means including first and second transformer means each having input and output circuits, the input circuits of both said transformer means being connected to said source of A.C. reference voltage, adjustable means in the output circuit of said first transformer means for producing a desired voltage level, adjustable means including a phase adjusting circuit in the output circuit of said second transformer means, comparing means having an input circuit and an output circuit, a multi-position voltage divider having input terminals connected to the output circuits of said first and second transformer means and a plurality of adjustable slider means, one of said adjustable slider means being connected to the input circuit of said comparing means, the input circuit of said comparing means being adapted to receive said second A.C. voltage, and a null detecting circuit connected to the output circuit of said comparing means for determining when the voltage from said multi-position voltage divider is equal to said second A.C. voltage, the positions of said plurality of adjustable slider means at a time when said null detecting circuit detects a null condition determining the ratio between said first and second A.C. voltages.

References Cited in the file of this patent

UNITED STATES PATENTS

| | | |
|---|---|---|
| 1,689,660 | Albrecht | Oct. 30, 1938 |
| 2,454,520 | Moore | Nov. 23, 1948 |
| 2,471,105 | Gustafsson et al. | May 24, 1949 |
| 2,656,977 | Cummings | Oct. 27, 1953 |
| 2,691,123 | Schuck | Oct. 5, 1954 |